United States Patent [19]
Pernet

[11] Patent Number: 4,900,273
[45] Date of Patent: Feb. 13, 1990

[54] CONTACT FRAME FOR AN IC CARD READER, SAID FRAME HAVING AN END-OF-STROKE CONTACT

[75] Inventor: Michel Pernet, Doubs, France

[73] Assignee: Societe Anonyme dite: ALCATEL CIT, Paris, France

[21] Appl. No.: 269,406

[22] Filed: Nov. 10, 1988

[30] Foreign Application Priority Data

Nov. 13, 1987 [FR] France .................. 87 15740

[51] Int. Cl.⁴ .......................................... H01R 13/54
[52] U.S. Cl. .................................................. 439/630
[58] Field of Search .......................... 439/629–637, 439/837, 839

[56] References Cited

U.S. PATENT DOCUMENTS 1,001,035 8/1911 Hubert .................. 439/839
4,006,336 2/1977 Boyden .

FOREIGN PATENT DOCUMENTS 0231409 8/1987 European Pat. Off. .
2578072 4/1986 France .
665381 1/1952 United Kingdom .................. 439/839
2124420 2/1984 United Kingdom .

Primary Examiner—Joseph H. McGlynn

[57] ABSTRACT

A contact frame for an IC card reader including contact elements for making connections with the IC card, the contact frame further including two electric contact blades (26, 28) carried by said frame and constituting an end-of-stroke contact (5), with one of said blades, a "fixed" blade (28), being coupled to the frame in such a manner that its stationary position relative to the frame is defined, while the other blade, a moving blade (26), is urged by a resilient force in a direction opposite to the direction in which a card is inserted into the reader, and is disposed in such a manner that a card being inserted comes into abutment thereagainst and imparts actuating motion thereto against its resilient force.

6 Claims, 4 Drawing Sheets

CONTACT FRAME FOR AN IC CARD READER, SAID FRAME HAVING AN END-OF-STROKE CONTACT

The present invention relates to IC card readers. The term "IC card" is used to designate any card including at least one electronic component with which electrical connections are to be established in a reader fitted with an apparatus which is operated by this type of card (e.g. a bank terminal or a pay phone).

BACKGROUND OF THE INVENTION

In general, IC card readers comprise guide means for guiding or positioning the card, means for verifying that a card is present in the reader, and is present in an appropriate position, and also contact elements for providing electrical connection with conducting pads on the IC card via which circuits are established to the apparatus including the IC card reader.

One such IC card reader is described in French patent number 2 534 713. The guide means therein are surfaces associated with the structure of the reader. The presence of a card is verified by means of an end-of-stroke microswitch and the contact elements are resilient metal blades mounted in a frame of insulating material.

There are thus three independent parts and assembly thereof is not described in detail. Unfortunately, given the dimensions of the parts coming into contact, in particular, such a structure requires the various parts to be assembled accurately every time, and not only is it expensive, but given the accumulated assembly tolerances on the various parts, this may also lead to it being impossible, in practice, to satisfy the requirements of the user. In addition, the actual assembly is left to the manufacturer of the apparatus, whereas such a manufacturer would find it appreciably easier to use a unit component which did not require any special precautions.

Further, a microswitch is a relatively expensive component for such an application even if use of a microswitch is justified by difficult environmental conditions (card dust, humidity, ...).

European patent application number 0 231 409 describes an IC card reader comprising a self-contained assembly made of a plurality of assembled pieces in accordance with the above description such that the same observations apply thereto.

The object of the present invention is to provide a contact frame for an IC card reader in which the end-of-stroke contact is integrated in a unit structure together, at least, with the contact elements for making connections to the IC card, while nevertheless satisfying requirements due to environmental conditions.

SUMMARY OF THE INVENTION

In addition to the contact elements for making connections to the IC card, the contact frame of the invention includes two electric contact blades carried by said frame and constituting an end-of-stroke contact, with one of said blades, a "fixed" blade, being coupled to the frame in such a manner that its stationary position relative to the frame is defined, while the other blade, a moving blade, is urged by a resilient force in a direction opposite to the direction in which a card is inserted into the reader, and is disposed in such a manner that a card being inserted comes into abutment thereagainst and imparts actuating motion thereto against its resilient force. This end-of-stroke contact is of the self-cleaning type. To this end, the "fixed" blade preferably includes a retaining finger, and two abutments are formed in the substance of the frame. The abutments are advantageously constituted by two opposite edges of a slot made in the frame and in which the retaining finger is engaged.

BRIEF DESCRIPTION OF THE DRAWINGS

An embodiment of the invention is described by way of example with reference to the accompanying drawings, in which.

MORE DETAILED DESCRIPTION

Figure 1:
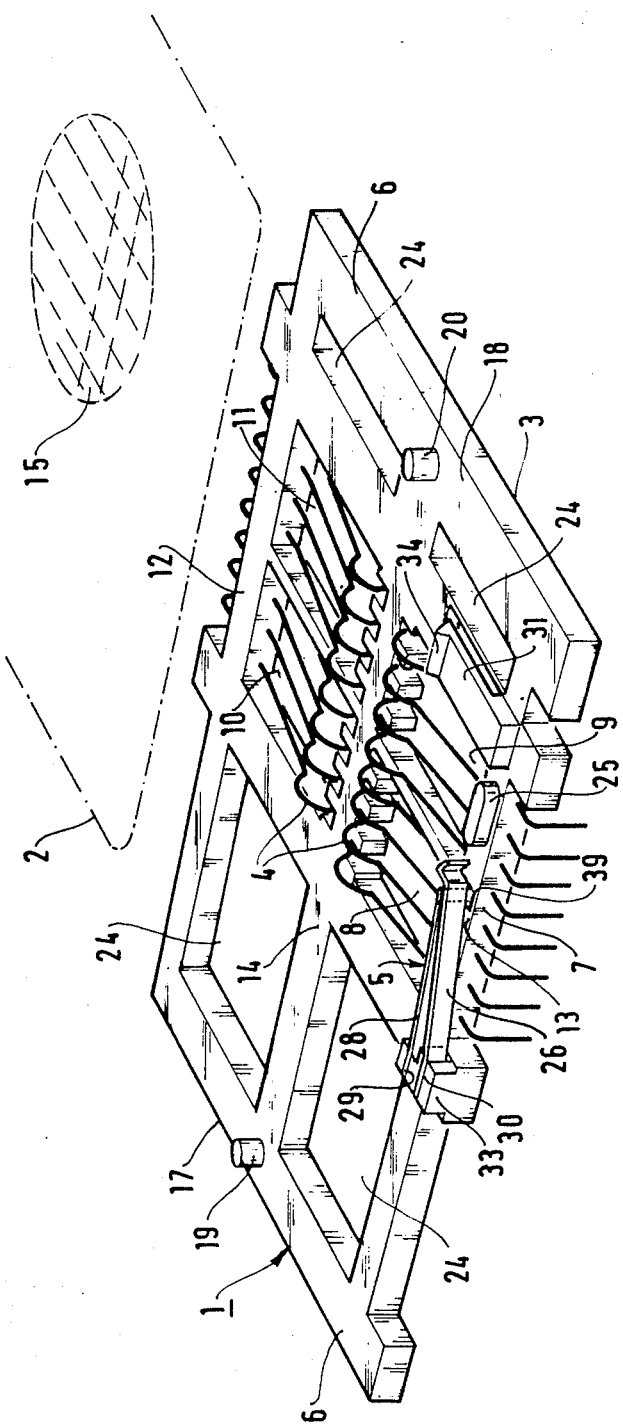
FIG. 1 is a perspective view of a contact frame in accordance with the present invention.

FIG. 1 is a perspective view of a contact frame 1 designed in accordance with the present invention and showing an IC card 2 in position to be inserted. For the purposes of this description, these two parts are shown upsidedown relative to the normal position thereof in which the card is presented with its contact zone on top and in which the contact frame 1 should therefore be disposed above the card and facing the card. The frame essentially comprises a part 3 made of molded insulating material and acting simultaneously: as a support for contact elements 4 used for making connections with the integrated circuit (IC) on the card 2; as a support for an end-of-stroke contact 5 for indicating that a card is present in the reader and is properly positioned for the purposes of being read; and as a support at least for slideways 6 for guiding the card and intended to lead it to the above-mentioned position in which it can be read.

Figure 2:
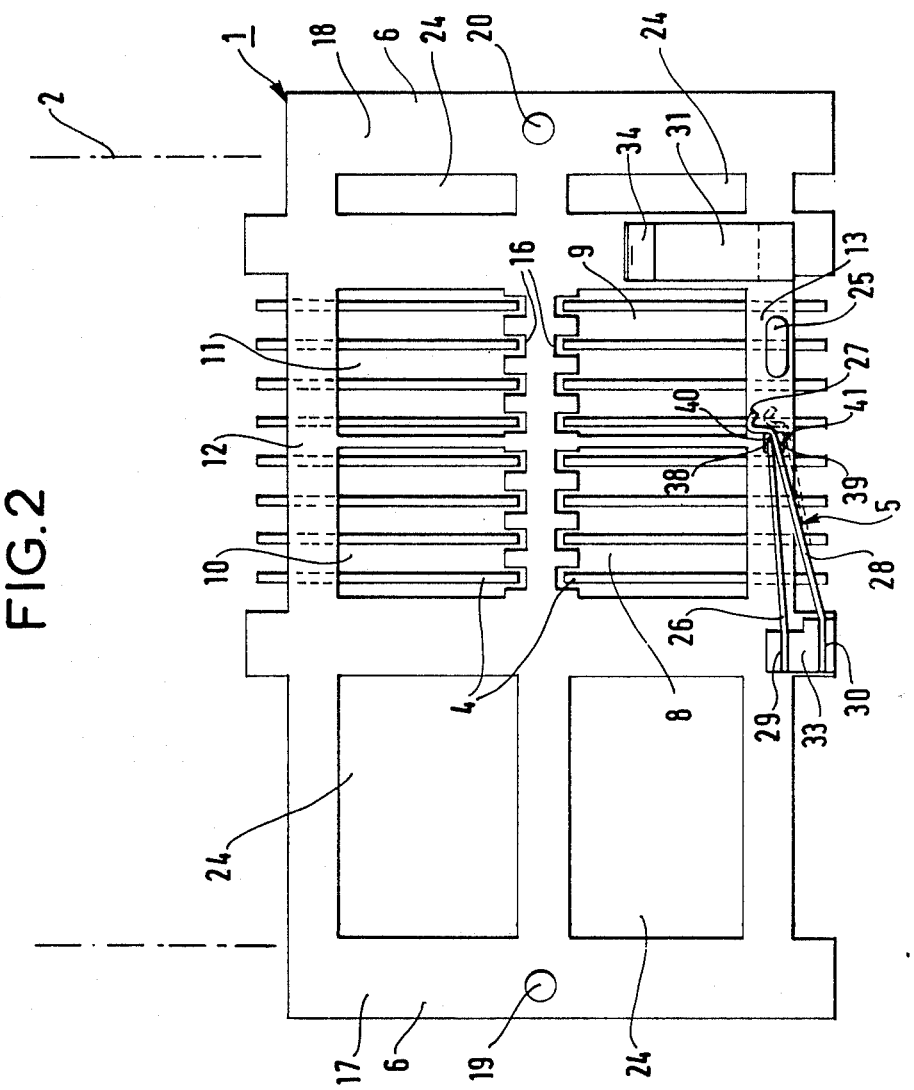
FIG. 2 is a plan view of the FIG. 1 frame.

To this end, the contact frame 1 comprises an inner frame 7 constituted by portions of the frame 1 delimiting connection windows 8, 9, 10, and 11. The contact elements 4 extend into these windows from bars 13 and 12 in which they are overmolded. It can thus be understood that the positions of the contact elements 4 are determined by the positions of a portion of the mold used for forming the frame 1. The contact elements 4 are shaped and they project above the plane 14 of the surface of the frame 1. They are intended to come into contact with contact pads in the connection zone 15 of the card 2 when the card is properly inserted in the IC card reader. With reference to FIG. 2 which is a plan view of the FIG. 1 contact frame, it can be seen that the windows 8 to 11 include indentations 16 which protect the ends of the contact elements 4.

Figure 3:
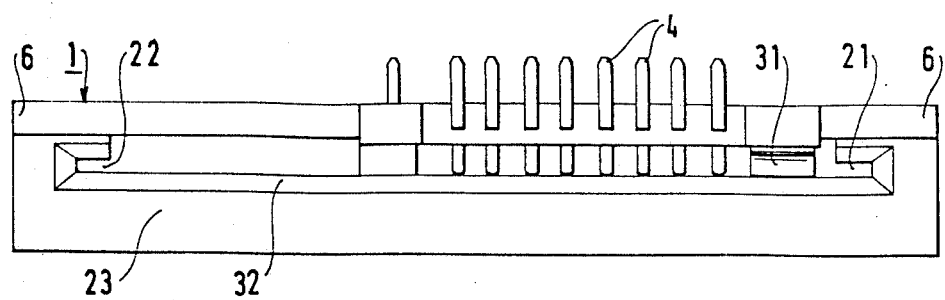
FIG. 3 is an end view of the FIG. 1 frame, with a lid constituting the card-guiding slideways.

The inner frame 7, as shown in FIGS. 1 and 2, is extended by two extensions 17 and 18 which terminate at their ends furthest from the inner frame 7 in slideway supports 6. These supports 6 are mere flat surfaces, each provided with at least one centering peg 19 or 20. Other slideway positioning means could be provided instead of or in addition to those mentioned above. Further, the centering pegs such as those shown in FIGS. 1 and 2 may also serve as fixing means (e.g. by rivets) for the slideways. Reference is made to FIG. 3 which is an end view of the frame 1 as shown in FIGS. 1 and 2, shown the usual way up, this time. It can be seen that slideways 21 and 22 are both formed in a piece of molded insulating material 23 constituting a lid and mounted on the support 6 of the frame 1. The lid part 23 is accurately positioned relative to the frame 1 by the centering pegs 19 and 20. It guides the card 2 by engaging its edges. If the same portion of the mold as that which defines the positions of the contact elements 4 also serves for defining the surfaces 6 and the centering pegs 19 and 20, then the positioning of the card 2 relative to the contact elements 4 is obtained with a degree of accuracy which is now related solely to the care with which the mold is made for forming the frame 1 and to the assembly tolerances between the frame 1 and the lid part 23, which assembly is performed in the factory, i.e. with narrow tolerances.

As can be seen in FIGS. 1 and 2, the extensions 18 and 19 are perforated with relatively large holes 24 in order to save plastic.

The contact frame 1 also carries an end-of-stroke contact 5 and an end-of-stroke abutment 25. The end-of-stroke contact 5 is a normally closed contact which is opened by the card shortly before it comes into abutment against the end-of-stroke abutment 25 by pressing against the end 27 of a moving blade 26, thereby separating the blade from a fixed contact 28. The two blades are force-fitted in slots 29 and 30 provided in the frame 1, thereby ensuring that they are accurately positioned. Further, the abutment 25 ensures that the card is properly positioned in the IC card reader.

Naturally, the end-of-stroke contact could be a normally open contact which closes instead of opening.

Finally, FIGS. 1 and 2 show a pusher 31 which is integrally molded with the frame 1 and which comprises a resilient blade for pressing the IC card 2 against the lid part 23, thereby defining the distance of the card from the contact elements 4.

As can be seen in FIG. 3, the pusher may alternatively be integrally formed with the lid part 23, extending from the end thereof which is not reached by the card, and being cantilevered back from that end towards the center of the frame 1. Its end 34 is shaped so as to be cammed away by the leading edge of the card 2, after which it exerts pressure on the card by means of a surface which is rounded so as to avoid damaging the card.

It may also be observed that the opening via which the IC card is inserted is chamfered at 32 in conventional manner.

Figure 4:
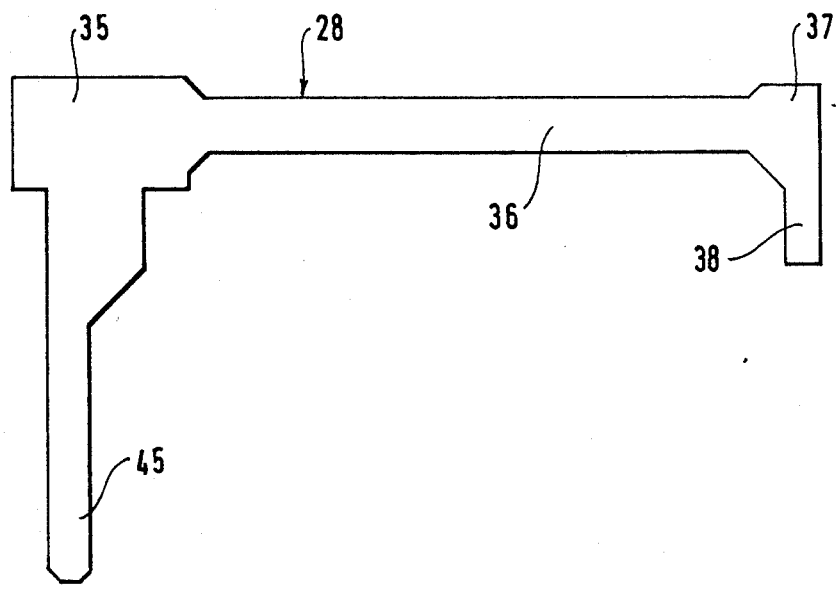
FIG. 4 is a plan view of the "fixed" blade of the end-of-stroke contact 5 shown in FIGS. 1 and 2.
Figure 5:
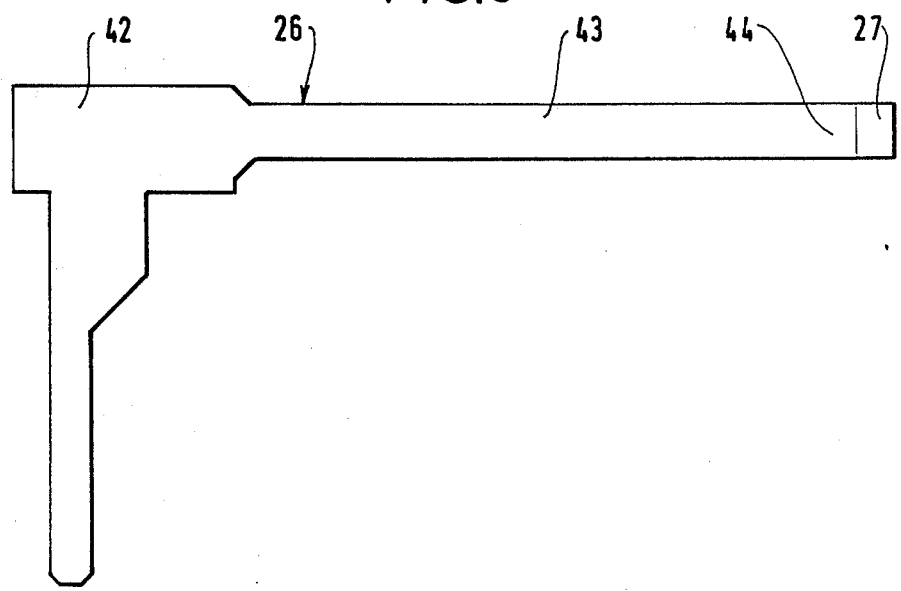
FIG. 5 is a plan view of the moving contact blade of the end-of-stroke contact 5 shown in FIGS. 1 and 2.

The end-of-stroke contact 5 is a self-cleaning contact. It comprises two contact blades 26 and 28 which are inserted in two slots 29 and 30 in the frame 1, made in a contact support 33 which constitutes a kind of block projecting proud from the surface 14 of the frame 1 and from which the blades extend sideways at such a height that the end 27 of the moving blade lies in the path of a card 2 reaching the end of its stroke in the reader. It may be assumed that the two blades are hinged where they leave the block 33. Their respective hinge points are relatively far apart by virtue of the block 33 being suitably shaped. The fixed or non-moving blade 28 which is shown in plan view in FIG. 4 thus comprises a blade end 35 which is inserted in the frame 1 with only a connection pin 45 projecting beyond the other side of the frame 1. The arm 36 of the blade is cantilevered out parallel to the surface 14 of the frame 1 and is terminated by a shaped contact surface 37 having a retaining finger 38 extending down therefrom. The retaining finger penetrates into a slot 39 made in the frame 1, which slot may be square in shape having two bearing surfaces 40 and 41 constituting abutments for the retaining finger 38. In the stationary position, the fixed blade 28 is prestressed in such a way as to be subjected to a resilient force urging it in the card insertion direction. The moving blade 26 which is shown in plan view in FIG. 5 comprises a blade end 42, a cantilevered arm 43, a contact surface 44, and a moving end 27 which is folded to act as an actuating cam (see FIGS. 1 and 2). This blade is prestressed in such a manner as to exert a resilient force towards the fixed blade 28. The force exerted by the moving blade 28 is greater than the force exerted by the fixed blade 28 such that in the stationary position both blades are pressed together against the abutment 40 of the slot 39.

When a card is inserted so as to press against the moving end 27 of the blade 26, the blade 26 moves in the card insertion direction and the blade 28 follows it by virtue of its own prestress. Since the hinge points of the two blades are at a distance apart from each other, the two contact surfaces rub against each other along the axial direction of the arms 36 and 43, thereby producing a self-cleaning effect on the contact. When the retaining finger 38 of the fixed blade encounters the abutment 41, contact between the two blades is interrupted. This indicates that the card is fully inserted. The card is thus about to reach the abutment 24 which will prevent it from moving any further. It may be observed, given the friction forces and in particular the friction force produced by the pusher 31, that the card 2 may be left fully inserted in the card reader in spite of the return force due to the moving blade 26.

If the end-of-stroke contact 5 were designed as a normally open switch, which possibility has already been mentioned above, then the moving blade 26 would be in front of the fixed blade 28, but the remainder of the structure would be unaltered except for specific dimensions, with the axial positions of the items being such that the contact 5 closes when the card is in exactly the same position that causes the contact to open as described above.

In either event, the advantages are the same. The end-of-stroke contact is included in a unit component which also includes the connection contact elements, thereby simplifying assembly of the card reader and solving assembly tolerance problems. It is of the self-cleaning type, thereby ensuring that good quality contact is retained over time. The "fixed" blade is free to move between two abutments, thereby providing the necessary accompanying stroke for contact-cleaning purposes while still accurately defining the position where contact is broken, or more precisely where the closed-to-open changeover occurs. This changeover point corresponds to a position of the IC card in which reading becomes possible (normally closed contact) or in which reading becomes no longer possible (normally opened contact).

Naturally, the above description is given by way of non-limiting example and numerous variants may be envisaged without going beyond the scope of the invention.

I claim:

1. A contact frame for an IC card reader comprising a slot for receiving an IC card, guide means for guiding the IC card through an end-of-stroke position up to a fully inserted position, contact elements carried by a molded frame of said contact frame and providing electrical connection to conducting pads on the main surface of the IC card, and an end-of-stroke contact comprising: a resilient "fixed" contact blade and a resilient moving contact blade, means for fixedly coupling one end of said "fixed" blade and one end of said moving blade to said molded frame of the contact frame, means causing the other end of the "fixed" blade to rest on a part of the contact frame due to its resilient force, and thus to be arrested in a well defined stationary position, the other end of said moving blade being positioned in the path of the inserted IC card such that the IC card comes into abutment against the other end of the moving blade and pushes said moving blade against its own resilient force, thereby operating the end-of-stroke contact precisely from the point said moving blade and said "fixed" blade just contacts each other, which point is defined by said part of said molded frame upon which the other end of said "fixed" blade comes to rest.

2. A contact frame according to claim 1, wherein said contact frame includes a fixed stop, said end-of-stroke contact is of the make type, the other end of the "fixed" blade is positioned so as to initially rest on said part of the contact frame, said other end of the moving blade is spaced apart from the "fixed" blade other end so that an almost fully inserted IC card pushes the other end of the blade until said moving blade other end comes into contact with the other end of the "fixed" blade, with the IC card continuing its insertion movement, against the resilient forces of both blades and bending both blades, and the end-of-stroke contact remains closed, said IC card coming against said stop and the end-of-stroke contact remaining closed until the card reaches a fully inserted position.

3. A contact frame according to claim 1, wherein said contact frame includes a fixed stop, said end-of-stroke contact is of the break type, the other end of the moving blade is so positioned that the IC card initially pushes the moving blade other end which rests, due to its own resilient force against said "fixed" blade upon card contact with said moving blade other end, with both blades bent, the moving blade due to the IC card pressure and against its own resilient force and the "fixed" blade due to its resilient force only causes the latter to follow the former, until the "fixed" blade bears on a part of the contact frame and stops in said well defined position, and wherein during further movement of said IC card during insertion, the moving part continues its movement, both blades separate, the IC card comes against said stop, and the end-of-stroke contact stays open with the IC card finally reaching a fully inserted position.

4. A contact frame according to claim 3, wherein the fixed coupling between the one end of the "fixed" blade and the frame is such as to leave the other end of said "fixed" blade free between two abutments, with the "fixed" blade being resiliently maintained against one of the abutments in the stationary position and accompanying the moving blade during its actuating motion while passing from one of the abutments to the other.

5. A contact frame according to claim 4, wherein the "fixed" contact blade includes a retaining finger and wherein said two abutments are formed in the material of the frame, with the retaining finger co-operating with said two abutments in order to limit the accompanying motion of the "fixed" blade.

6. A contact frame according to claim 5, wherein said abutments are two opposite sides of a slot made through the material of the frame, with said retaining finger extending into said slot.

* * * * *